United States Patent [19]

Diez et al.

[11] Patent Number: 4,767,482

[45] Date of Patent: Aug. 30, 1988

[54] APPARATUS FOR SEVERING AND HEAT SEALING SHEETS OF THERMOPLASTIC MATERIAL

[75] Inventors: Werner Diez, Frickenhausen; Peter Gottwald, Metzingen, both of Fed. Rep. of Germany

[73] Assignee: Womako Maschinenkonstruktionen GmbH, Nürtingen, Fed. Rep. of Germany

[21] Appl. No.: 752,256

[22] Filed: Jul. 3, 1985

[30] Foreign Application Priority Data

Jul. 11, 1984 [DE] Fed. Rep. of Germany ....... 3425430

[51] Int. Cl.⁴ .............................................. B31B 1/16
[52] U.S. Cl. ....................................... 156/163; 83/18; 83/175; 156/229; 156/251; 156/494; 156/583.2; 156/515
[58] Field of Search ...................... 156/251, 515, 583.1, 156/583.2, 583.4, 163, 164, 229, 495, 494; 493/203; 53/552; 83/175, 18

[56] References Cited

U.S. PATENT DOCUMENTS

| | | | |
|---|---|---|---|
| 2,570,273 | 10/1951 | Dryor | 156/163 X |
| 3,640,790 | 2/1972 | Rowley | 156/251 |
| 3,803,963 | 4/1974 | Hunt | 83/175 X |
| 3,805,485 | 4/1974 | Swope | 156/515 X |
| 3,912,575 | 10/1975 | Zelnick | 156/515 |
| 3,940,305 | 2/1976 | Stenberg | 156/515 |
| 3,954,371 | 5/1976 | Hutt et al. | 493/203 X |
| 4,019,947 | 4/1977 | Stock et al. | 156/515 X |
| 4,488,466 | 12/1984 | Jones | 83/175 |

Primary Examiner—David Simmons
Attorney, Agent, or Firm—Peter K. Kontler

[57] ABSTRACT

Apparatus for simultaneously severing and heat sealing of overlapping portions of thermoplastic sheets between a fixedly mounted anvil and a reciprocable heated blade has an uncooled hold down device with two metallic plate-like members which flank the blade and are confined in layers of silicone so that they are thermally insulated from the blade and need not come in direct contact with the thermoplastic material. Those portions of the silicone layers which contact the exposed side of the adjacent sheet opposite the anvil at the respective sides of the blade tend to stretch the sheets in a direction at right angles to the cutting plane to thus ensure immediate separation of the welded seams which are formed by the blade during severing of the sheets.

8 Claims, 3 Drawing Sheets

APPARATUS FOR SEVERING AND HEAT SEALING SHEETS OF THERMOPLASTIC MATERIAL

BACKGROUND OF THE INVENTION

The present invention relates to apparatus for treating foils or like sheets of thermoplastic material, and more particularly to improvements in apparatus for severing and simultaneously heat sealing (thermowelding) overlapping portions of synthetic thermoplastic sheets. Still more particularly, the invention relates to improvements in apparatus of the type wherein a hold down device is provided to bias one of the sheets against the other sheet and to thereby bias the other sheet against a preferably stationary anvil or an analogous support in the course of and preferably for a selected interval following a combined severing and thermosealing operation which is performed by a heated tool.

Apparatus of the above outlined character are often utilized to confine goods in envelopes consisting of two synthetic plastic sheets whose marginal portions are integral with or are welded to each other. For example, the confined goods can constitute discrete steno pads, stacks of two or three superimposed steno pads or other stationary products. As a rule, the tool includes a holder for a continuously heated knife blade whose cutting edge is caused to bear against the exposed side of one of the overlapping synthetic thermoplastic sheets and to thereby urged the exposed side of the other sheet against an anvil or an analogous support. In lieu of a knife, the tool can employ an impulse-heated wire which is used to sever the sheets as well as to bond the sheets to each other at both sides of the cutting plane. The hold down device is normally made of sheet steel and the apparatus may but need not be provided with means for cooling the hold down device.

The purpose of the hold down device is to ensure that the sheets lie flat against the support and do not exhibit any folds or wrinkles in the region of the cutting plane. Moreover, the hold down device is normally called upon to bias the severed parts of the overlapping sheets against the support for a certain interval of time following the combined severing and heat sealing operation so as to allow the freshly bonded marginal portions of the sheets to dissipate heat and to thus form reliable welded seams, one at each side of the severing plane.

If the hold down device is made of sheet steel and does not embody or does not cooperate with a cooling unit, the material of the hold down device is rapidly heated to a temperature at which the material of the sheets cannot set in the regions of contact with the hold down device. On the contrary, the latter plasticizes the contacted portions of the adjacent sheet which affects the quality of the severing action and necessitates relatively long intervals for cooling of the freshly formed welded seams. If the seams are to be formed in the gaps between relatively tall stacks of steno pads or the like, the portions of sheets in such gaps are likely to adhere to the corresponding sections of the hold down device and to melt. This entails rapid contamination of the hold down device as well as of the tool so that the operation must be interrupted at frequent intervals in order to clean the hold down device and the tool. Moreover, the quality of the severing and thermosealing operation deteriorates proportionally with the increasing accumulation of plastic material on the hold down device and/or on the tool.

For the foregoing reasons, hold down devices which are not equipped or combined with cooling means cannot be used with permanently heated blade-like combined severing and heat sealing tools. They are merely useful in conjunction with tools which employ impulse-heated wires, i.e., wires which are heated at a certain frequency, always when they come in contact with the thermoplastic material. Moreover, the frequency at which the wire is heated in pulsating fashion cannot be too high because this would entail excessive heating of the hold down device. Therefore, such apparatus cannot be utilized in high-speed production lines which turn out stationery products or other goods in large numbers per unit of time and wherein the combined severing and heat sealing tool must be continuously heated or must be heated at a high or very high frequency.

Attempts to solve the aforediscussed problems include the provision of a variety of cooling means for the hold down device. The cooling means can operate with circulating water, a suitable emulsion or a gaseous fluid. This, in turn, contributes significantly to the bulk and cost of the apparatus. Moreover, the energy requirements of such cooling systems are substantial because they must be equipped with pumps or other suitable means for circulating large quantities of a gaseous or liquid coolant per unit of time. As a rule, the width or thickness of a cooled hold down device substantially exceeds the width or thickness of an uncooled device. Consequently, neighboring goods which are confined intermediate two synthetic plastic sheets and must be sealed from the surrounding atmosphere by making welded seams therebetween cannot be placed close to each other because the gaps between neighboring goods must be sufficiently wide to provide room for the introduction of bulky hold down devices. Therefore, pouches or like envelopes which are obtained upon completion of the heat sealing operation are larger than necessary which presents problems during packing of such goods in containers and entails unnecessary loses in synthetic plastic material. As a rule, such pouches are thereupon caused to shrink in order to closely follow the outlines of the confined goods. This is not possible if the dimensions of the pouches are excessive, i.e., the pouches are likely to wrinkle which detracts from the appearance and sales appeal of the confined goods. Unnecessary losses in the material of synthetic plastic foils are very pronounced if the apparatus is to confine large numbers of goods in discrete synthetic plastic envelopes which are larger than absolutely necessary and desirable for the purposes of obtaining envelopes which closely hug the outlines of the confined goods.

Another drawback of cooled hold down devices is that they withdraw a certain amount of heat energy from the combined severing and heat sealing tool, i.e., the energy requirements of the means for heating the tool are higher than necessary and the energy requirements of the means for withdrawing heat from the cooling medium (if the cooling medium is recirculated) are also higher than necessary.

A further drawback of heretofore known hold down devices (which often comprise pairs of rigid plates made of steel or another metallic material and flanking the blade or wire of the combined severing and heat sealing tool) is that the plates merely bear upon the exposed side of the adjacent sheet and press it against the other sheet which, in turn, is pressed against the support. Thus, when the sheets are severed in a cutting plane which is located between the two plates and the plates continue to bias the thus obtained parts of the sheets against the support, the freshly formed welded seams are likely to adhere to the support. If the mass of the confined goods is not substantial, such goods cannot readily separate the freshly welded seams from the support so that the products which adhere to the support must be detached and removed in a time-consuming operation which can lead to a complete shutdown of an entire production line.

Commonly owned copending patent application Ser. No. 678,236 filed Dec. 5, 1984 by Bernd Ramcke discloses an apparatus wherein the combined severing and thermosealing tool is pivotable to and from an operative position in which it severs and bonds travelling sheets of thermoplastic material. The severing station is cooled by a jet of compressed air issuing from a nozzle.

OBJECTS AND SUMMARY OF THE INVENTION

An object of the invention is to provide a novel and improved combined severing and heat sealing apparatus which is constructed and assembled in such a way that the freshly formed welded seams are unlikely to adhere to the support and which allows for the severing and heat sealing of thermoplastic sheets at a frequency much higher than that achievable with heretofore known apparatus.

Another object of the invention is to provide a novel and improved hold down device for use in the above outlined apparatus.

A further object of the invention is to provide an apparatus which can employ a continuously heated combined severing and heat sealing tool without risking rapid contamination of the tool and/or of the hold down device with thermoplastic material.

An additional object of the invention is to provide an apparatus wherein the folding, creasing or wrinkling of thermoplastic sheets in the region of the cutting plane is prevented in a simple but highly effective and inexpensive way.

Still another object of the invention is to provide the apparatus with a novel and improved hold down device which can perform its intended function as well as additional functions without the need for cooling.

An additional object of the invention is to provide an apparatus which can be used for the making of cuts and welded seams at a high frequency without the need for cooling of the hold down device so that the dimensions of the hold down device can be reduced to a minimum with attendant savings in the synthetic plastic sheet material.

A further object of the invention is to provide a novel and improved method of severing and thermosealing portions of overlapping thermoplastic sheets to each other.

One feature of the invention resides in the provision of an apparatus for simultaneous severing and heat sealing of thermoplastic sheets, especially foils which are made of synthetic thermoplastic material. The apparatus comprises a sheet supporting anvil, a hold down device which serves to urge the sheets against the anvil in the course of a combined severing and heat sealing operation and includes a core and a heat-resistant outer layer surrounding at least a portion of the core and serving to contact the sheets in the course of the combined severing and heat sealing operation, a combined severing and heat sealing tool which is movable into engagement with sheets while the sheets are supported by the anvil and are held by the heat-resistant layer of the hold down device, and suitable means (e.g., one or more heating cartridges) for preferably uninterruptedly heating the tool.

The heat-resistant layer of the hold down device can consist of or comprise silicone, for example, silicone rubber.

The tool can comprise a blade and the core of the hold down device can comprise at least one plate-like member whose thickness matches or approximates the thickness of the blade. In accordance with a presently preferred embodiment of the apparatus, the core of the hold down device comprises two platelike members which flank the blade of the combined severing and heat sealing tool. The heat-resistant layer then comprises a discrete section for each of the plate-like members and at least one of these sections has an end face with a preferably elongated edge which is arranged to contact a sheet in the course of the combined severing and heat sealing operation. It is preferred to provide each of the sections with an end face and to provide each end face with a preferably elongated edge. The sections are preferably elastic so that they can undergo deformation in response to engagement with a sheet which is supported by the anvil so as to stretch the sheet between the edges and to thus prevent the formation of fold lines or wrinkles in the region of the welded seams. Such end faces preferably slope away from the anvil and toward the respective sides of the blade of the tool. In other words, the edges preferably constitute those portions of the respective end faces which are remotest from the blade. This causes the edges to move apart from each other when the hold down device is urged toward the anvil and bears against a sheet between the end faces and the anvil whereby the hold down device automatically stretches the sheet between the two edges and ensures the making of a clean cut as well as immediate separation of the freshly formed welded seams from each other. Therefore, the welded seams cannot adhere to the anvil and are much more likely to be cooled within very short intervals of time.

Another feature of the invention resides in the provision of a method of severing and simultaneously heat sealing overlapping portions of thermoplastic sheets to each other. The method comprises the steps of preferably fixedly supporting the exposed side of one of the overlapping portions, biasing the exposed side of the other overlapping portion so that these portions are pressed against each other, simultaneously stretching the overlapping portions in a predetermined direction, and contacting the exposed side of the other portion by a heated tool which severs the overlapping portions in a plane extending transversely of the predetermined direction and simultaneously heat seals the overlapping portions to each other at both sides of the plane whereby the thus obtained severed parts of the overlapping portions are automatically separated from each other as a result of the stretching step. Moreover, such stretching reduces the likelihood of wrinkling of the sheets in the severing plane.

The stretching step can comprise contacting the exposed side of the other portion with a pair of spreading implements (such as the aforediscussed sections of the layer forming part of the hold down device) consisting of or containing silicone rubber or an analogous elastomeric heat-resistant material.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
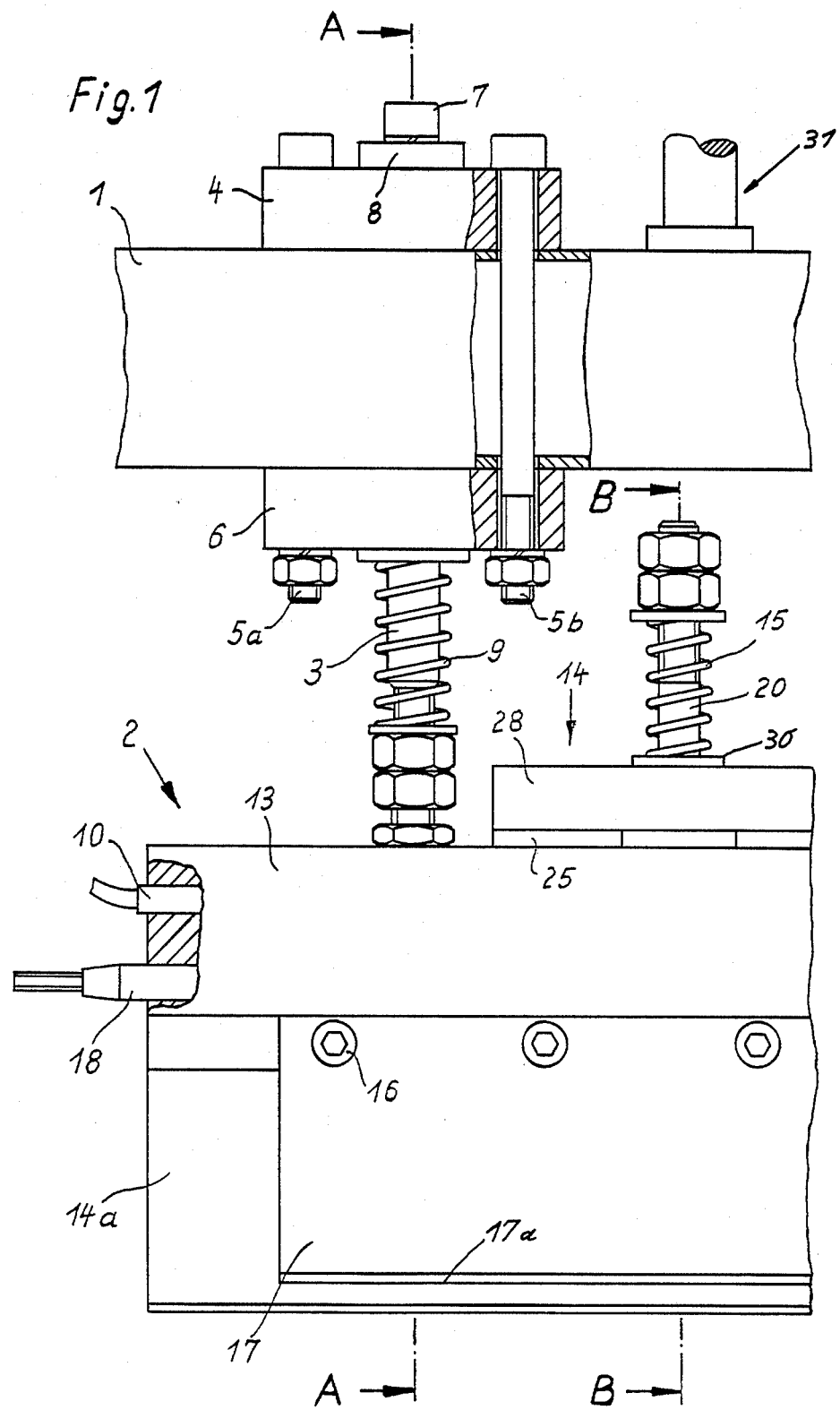
FIG. 1 is a fragmentary partly side elevational and partly sectional view of an apparatus which embodies one form of the invention, with one half of the hold down device omitted.
Figure 2:
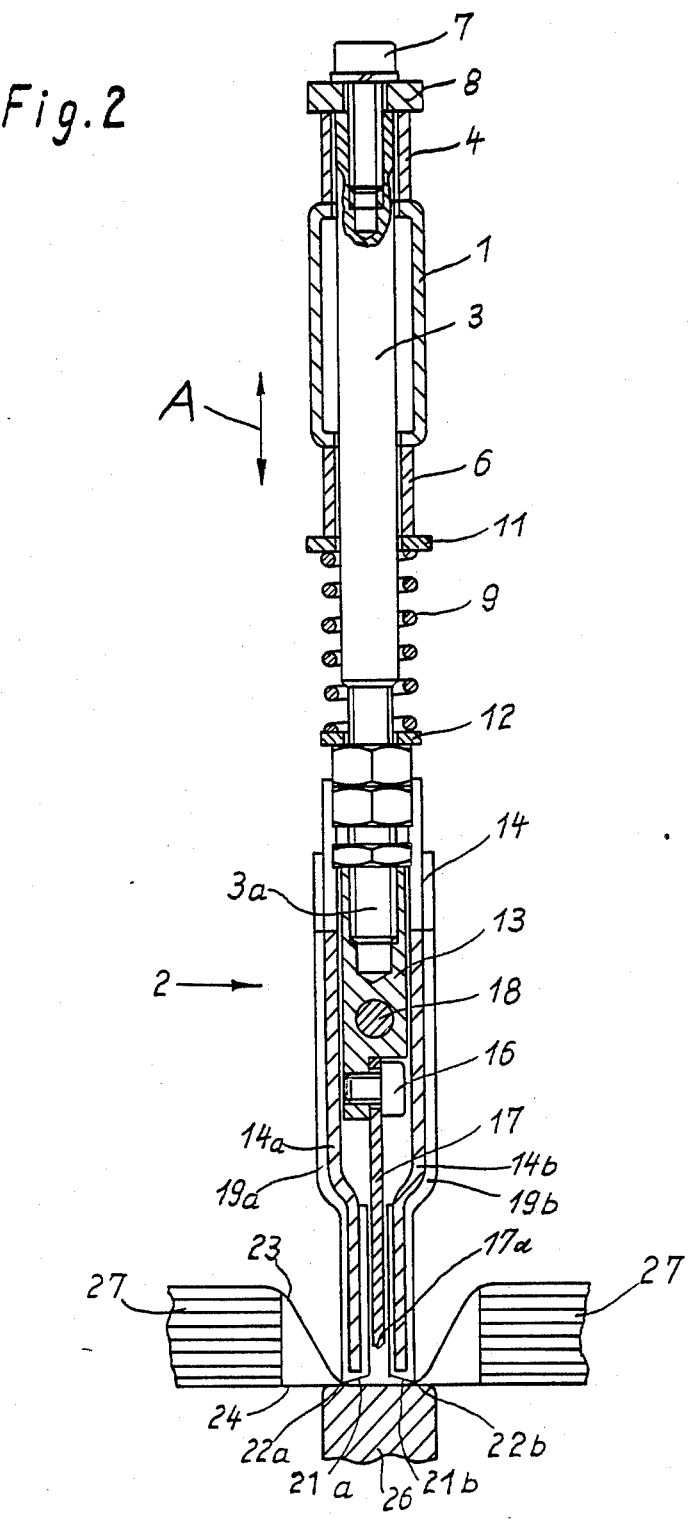
FIG. 2 is a sectional view as seen in the direction of arrows from the line A—A of FIG. 1.
Figure 3:
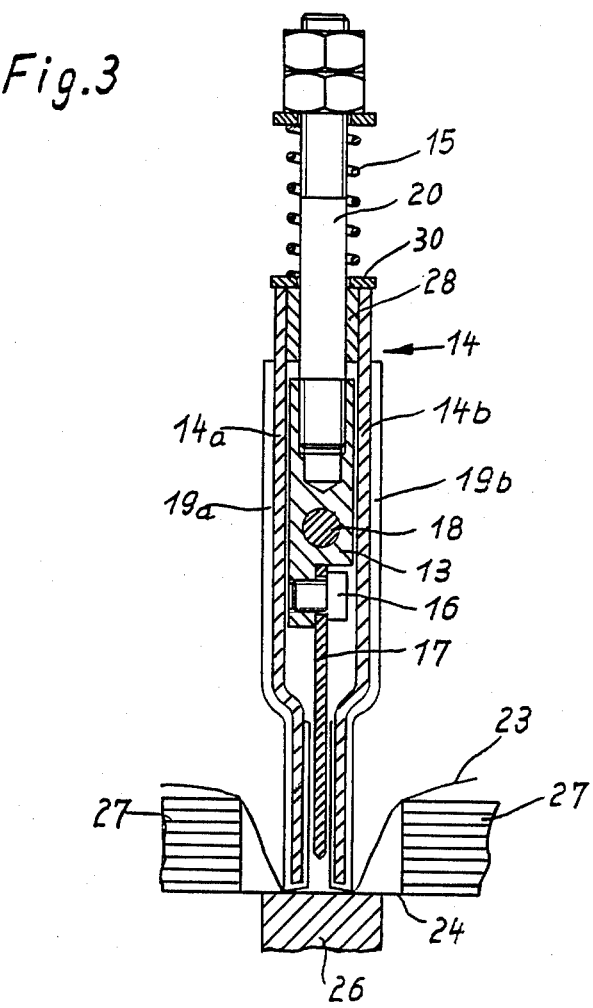
FIG. 3 is a sectional view as seen in the direction of arrows from the line B—B of FIG. 1.

The apparatus which is shown in FIGS. 1 to 3 comprises an elongated hollow carrier 1 for a unit 2 including a combined severing and heat sealing tool and a hold down device 14. The length of the carrier 1 equals or approximates that of the unit 2, and the latter is secured to the carrier 1 by two or more vertical rods 3 (only one can be seen in FIGS. 1 and 2). These rods are spaced apart from one another, as considered in the longitudinal direction of the carrier 1. The upper portions of the rods 3 extend beyond the carrier 1 and into an upper holder 4, and those portions of the rods 3 which extend downwardly beyond the carrier 1 pass through a lower holder 6. The holders 4 and 6 are attached to each other and to the carrier 1 by sets of vertical bolts 5a and nuts 5b. The shanks of the bolts 5a extend through the holders 4, 6 and through the carrier 1. The holder 4 has a top portion or platform 8 which is engaged by the heads of screws 7 whose shanks are driven into tapped bores in the upper end faces of the respective rods 3 so that the heads of the bolts 7 determine the extent to which the rods 3 can descend under the action of compression coil springs 9. Each of these springs reacts against a flange 11 at the underside of the holder 6 and bears against a collar 12 on the respective rod 3, i.e., the rods 3 are permanently biased downwardly to the lower end positions corresponding to that of the rod 3 which is shown in FIGS. 1 and 2.

The tool and the hold down device 14 of the unit 2 are supported by the lower portions of the rods 3. The enlarged upper portion 13 of the tool has tapped bores for the externally threaded lower end portions 3a of the rods 3. The lower portion of the tool constitutes a relatively thin elongated blade 17 which is separably affixed to the upper portion 13 (and hence to the rods 3) by a set of screws 16. The blade 17 is continuously heated by one or more heating cartridges 18 through the medium of the enlarged upper portion 13. Furthermore, the enlarged upper portion 13 of the tool carries a temperature sensor 10 which generates signals for regulation of the temperature of the blade 17 via heating cartridge 18.

The hold down device 14 is mounted on the tool 13, 17 in such a way that it shares certain movements of the tool and carrier 1 relative to a stationary support in the form of an anvil 26 but that the blade 17 of the tool can move relative to the hold down device when the latter already bears against the exposed upper side or surface of a portion of the upper one of two overlapping synthetic thermoplastic sheets or foils 23, 24 to urge the exposed underside of the sheet 24 against the top surface of the anvil 26. As can be seen in FIGS. 1 and 3, the means for movably coupling the tool with the hold down device 14 comprises two or more (only one shown) upright bolts 20 whose lower end portions mate with the upper portion 13 of the tool. The shank of each bolt 20 is surrounded by a compression coil spring 15 whose uppermost convolution reacts against a washer on the respective bolt 20 and whose lowermost convolution bears against a platform 30 on the upper end portion of the hold down device 14.

The hold down device 14 comprises a core including two plate-like members 14a, 14b which can be made of sheet steel and whose thickness can match or approximate that of the blade 17, and a composite layer which is made of a heat-resistant elastomeric material and at least partially surrounds the core. The illustrated layer comprises two halves or sections 19a, 19b which respectively surround the lower portions of the members 14a, 14b and are preferably made of or contain silicone, preferably silicone rubber or an analogous heat-resistant elastomeric material. The plate-like members 14a, 14b of the hold-down device 14 flank the blade 17 of the tool, and their confined lower end portions are closely adjacent to the respective sides of the tool (this can be readily seen in FIGS. 2 and 3). It will be noted that the member 14b and the corresponding section 19b of the heat-resistant layer of the hold down device 14 are omitted in FIG. 1 for the sake of clarity.

The lower end faces 21a, 21b of the sections 19a, 19b are inclined with reference to each other and with reference to the plane of the upper side of the anvil 26, and they slope upwardly toward the respective sides of the blade 17. Those portions of the end faces 21a, 21b which are remotest from the blade 17 constitute edges 22a, 22b which extend in parallelism with the cutting edge 17a of the blade 17. At least those portions of the sections 19a, 19b which are provided with the end faces 21a, 21b are elastic so that the edges 22a, 22b move apart when they are caused to bear against the exposed upper side of that portion of the upper sheet 23 which extends between the neighboring goods 27. Such goods are disposed between the sheets 23, 24 and the purpose of the improved apparatus is to sever the sheets 23, 24 in the (cutting) plane of the cutting edge 17a as well as to heat seal the sheets 23, 24 at both sides of such plane in order to ensure that the goods 27 are properly sealed in the thus obtained envelopes or pouches and can be moved relative to each other, e.g., to a stacking station where a preselected number of discrete goods (each of these goods can constitute a stack of overlapping steno pads, exercising pads or other stationery products) is introduced into a carton or the like.

The operation of the improved apparatus is as follows:

The carrier 1 is moved downwardly toward the anvil 26 (e.g., by one or more fluid operated motors 31 in the form of cylinder and piston units in a manner not forming part of the invention). The directions of reciprocatory movement of the carrier 1 are indicated by a double-headed arrow A. The carrier 1 thereby moves the edges 22a, 22b of the end faces 21a, 21b on the sections 19a, 19b of the hold down device 14 against the exposed upper side of the sheet 23 in the gap between the illustrated goods 27 whereby the edges 22a, 22b move apart due to elasticity of the lower portions of the sections 19a, 19b as well as due to the provision of sloping end faces 21a, 21b so that the sections 19a, 19b stretch the sheets 23 and 24 in a direction at right angles to the cutting plane (of the cutting edge 17a). This ensures the elimination of any creases, wrinkles and similar irregularities, i.e., the neighboring portions of the sheets 23, 24 lie flat against each other and against the upper side of the anvil 26.

The carrier 1 continues to move downwardly whereby the cutting edge 17a reaches and severs the sheets 23, 24 in cooperation with the anvil 26 while the sections 19a, 19b of the hold down device 14 continue to bear against the upper side of the sheet 23. The movement of the tool 13, 17 relative to the hold down device 14 causes the springs 15 to store energy. The blade 17 not only severs the sheets 23, 24 but also provides the thus obtained parts of overlapping portions of the two sheets with welded seams at both sides of the cutting plane. The carrier 1 can continue to move downwardly after the cutting edge 17a strikes against the anvil 26 so as to ensure the making of a clean cut while the springs 9 store energy.

The edge 22, 22b immediately separate the thus obtained parts of the overlapping portions of the sheets 23, 24 because the lowermost portions of the sections 19a, 19b are free to move apart as soon as the severing step is completed. This ensures that the freshly formed welded seams are separated from each other and move relative to the anvil to reduce the likelihood or possibility of adherence of such welded seams to the anvil. Moreover, the lower end portions of the sections 19a, 19b separate the freshly formed welded seams from the blade 17 so that the seams can undergo immediate cooling and the goods 27 can be moved relative to each other practically immediately following completion of a combined severing and heat sealing operation. This not only promotes rapid cooling of the welded seams but also reduces the likelihood of contamination of the blade 17 with thermoplastic material.

Since the hold down device 14 need not be cooled, and since the metallic plate-like members 14a, 14b are shielded from heat by the respective sections 19a, 19b of the heat-resistant layer, the thickness of the members 14a, 14b need not exceed that of the blade 17 so that the hold down device 14 and the blade 17 can readily enter very narrow gaps between tall goods 27 consisting of stationery products or the like without risking contamination of the outer sides of the sections 19a, 19b and/or of the members 14a, 14b and/or of the blade 17.

The carrier 1 is thereupon caused to move upwardly and to entrain the tool including the enlarged portion 13 and blade 17 as soon as the platform 8 of the upper holder 4 engages the heads of the screws 7. The edges 22a, 22b continue to bear against the respective parts of the sheet 23 until the springs 15 complete the dissipation of energy, i.e., until the hold down device 14 begins to share the upward movement of the carrier 1 so that its edges 22a, 22b are lifted above the level of the confined goods 27 and allow the goods to advance relative to the anvil 26 (in a direction to the right or to the left, as viewed in FIG. 2 or 3) in order to place the gap between a different pair of goods 27 into register with the lifted unit 2.

The platform 30 of the hold down device 14 is located at a level above a shock absorber 28 (which can be made of a suitable elastomeric material) serving to terminate the upward movement of the tool without the generation of detectable noise and without excessive wear upon the parts which move relative to each other. If desired, only the underside of the shock absorber 28 can be coated with a suitable elastomeric or similar damping material. This is shown in FIG. 1 wherein the underside of the shock absorber 28 carries elastic pads 25.

An important advantage of the improved apparatus is that the hold down device 14 need not be positively cooled which renders it possible to employ a relatively small and compact hold down device so that the latter can readily enter a narrow gap between two closely adjacent commodities. The provision of cooling means for the hold down device would necessitate the utilization of several conduits for admission and evacuation of a cooling medium as well as the provision of means for circulating the medium. Reduction of the width of the gaps between neighboring commodities renders it possible to achieve substantial savings in the material of thermoplastic sheets as well as to ensure that, once the envelopes have shrunk, they closely follow the outlines of the confined commodities. Furthermore, the ability of envelopes to shrink into close contact with the confined commodities reduces the likelihood of wrinkling and similar irregularities which detract from the appearance and sales appeal of the finished products. The energy requirements of the apparatus are now because the hold down device (which need not be cooled) does not withdraw substantial amounts of heat from the blade 17 and also because there is no need for pumps and motors which are used in conventional apparatus for the circulation of a gaseous or liquid cooling medium.

Another important advantage of the improved apparatus is that the thermoplastic material of the sheets is highly unlikely to adhere to and to contaminate the hold down device, the tool and/or the anvil 26. This is due to the selection of the material of the layer including the sections 19a, 19b as well as to such configuration of the sections 19a, 19b that they immediately shift the freshly formed welded seams relative to the blade 17 and the anvil 26 as soon as the severing and heat sealing operation is completed. All this is achieved without the need for positively cooling the hold down device.

A further important advantage of the improved apparatus is that the hold down device performs the additional function of stretching the sheets 23, 24 in the region of the cutting plane so that the edge 17a can make a clean cut and can form eye-pleasing and highly reliable welded seams. Moreover, the tendency of the lower end portions of the sections 19a, 19b to move apart reduces the length of intervals which are required for cooling of the welded seams so that the frequency at which the apparatus can sever the sheets 23, 24 can be increased without reducing the quality of the seams. Rapid cooling of the seams and the absence of any tendency of the material of the sheets to adhere to the blade 17, to the sections 19a, 19b and/or to the anvil 26 reduces the likelihood of malfunction and/or the need for prolonged interruptions of the operation. The output of the apparatus is surprisingly high on the additional ground that the tool, the hold down device and the anvil remain uncontaminated for long periods of time. Thus, the need for maintenance is practically nil and the overall initial cost of the apparatus is low because it need not be equipped with cooling means for the hold down device.

Without further analysis, the foregoing will so fully reveal the gist of the present invention that others can by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for simultaneous severing and heat sealing of thermoplastic sheets, comprising a sheet supporting anvil having a flat sheet supporting surface; a hold-down device arranged to urge the sheets against the supporting surface of the anvil in the course of a combined severing and heat sealing operation, said device having a core and a heat-resistant outer layer surrounding at least a portion of the core and arranged to contact the sheets in the course of said operation; a combined severing and heat sealing tool movable into engagement with sheets which are supported by said surface of the anvil and are held by said heat-resistant layer, said tool comprising a blade having a predetermined thickness and said core including two plate-like members whose thickness matches or approximates said predetermined thickness and which flank said blade, said layer including a discrete elastic section for each of said plate-like members and each of said sections having an end face including an edge which is arranged to contact a sheet in the course of the combined severing and heat sealing operation, the end face of at least one of said sections sloping away from the surface of said anvil and toward the respective side of said blade and said sections being arranged to undergo deformation in response to engagement with a sheet which is supported by said surface of the anvil so as to stretch the sheet between said edges; and means for heating said tool.

2. The apparatus of claim 1, wherein said layer contains silicone.

3. The apparatus of claim 1, wherein said layer consists of silicone.

4. The apparatus of claim 1, wherein said layer consists of silicone rubber.

5. The apparatus of claim 1, wherein said edges constitute those portions of the respective end faces which are remotest from said blade.

6. A method of heat sealing and simultaneously severing overlapping portions of thermoplastic sheets to each other, comprising the steps of fixedly supporting one side of one of the overlapping portions on a flat supporting surface; biasing one side of the other of the overlapping portions so that the overlapping portions are pressed each other, including contacting said one side of the other portion with a pair of elastic spreading implements; simultaneously stretching the overlapping portions in a predetermined direction by the spreading implements; and contacting the one side of the other portion with a heated tool which severs the overlapping portions transversely of said directly and simultaneously heat seals the overlapping portions to each other whereby the thus obtained severed parts of the overlapping portions are automatically separated from each other as a result of said streching step.

7. The method of claim 6, wherein said streching step comprises contacting said one side of said other portion with a pair of elastic spreading implements consisting of or containing silicone.

8. Apparatus for sumultaneous severing and heat sealing of thermoplastic sheets, comprising a sheet supporting anvil having a flat sheet supporting surface; a hold-down device arranged to urge the sheets against the supporting surface of the anvil in the course of a combined severing and heat sealing operation, said device having a core and a heat-resitant outer layer surrounding at least a portion of the core and having an edge arranged to contact the sheets in the course of said operation; a combined severing and heat sealing tool movable into engagement with sheets which are supported by said surface of the anvil and are held by said heat-resistant layer, said tool comprising a blade having a predetermined thickness and said core including at least one plate-like member whose thickness matches or approximates said predetermined thickness, said outer layer having an end face adjacent said edge and sloping away from said surface of the anvil and toward said blade; and means for heating said tool.

* * * * *